US005220157A

United States Patent [19]

Martin et al.

[11] Patent Number: 5,220,157

[45] Date of Patent: Jun. 15, 1993

[54] SCRIP CONTROLLED CASH DISPENSING SYSTEM

[75] Inventors: Patrick M. Martin, Plano; Tod G. Franklin, Dallas, both of Tex.

[73] Assignee: Tidel Engineering, Inc., Carrollton, Tex.

[21] Appl. No.: 765,085

[22] Filed: Sep. 24, 1991

[51] Int. Cl.$^5$ .............................................. G06F 15/30

[52] U.S. Cl. .................................... 235/379; 235/375; 235/382

[58] Field of Search ......................... 235/375, 376, 382

[56] References Cited

U.S. PATENT DOCUMENTS 4,463,939 8/1984 Watanabe ............................ 235/379
4,812,986 3/1989 Smith .................................. 235/379
5,025,139 6/1991 Halliburton, Jr. .................. 235/379
5,122,950 6/1992 Benton et al. ....................... 235/379

*Primary Examiner*—William L. Sikes
*Assistant Examiner*—Scott A. Ouellette
*Attorney, Agent, or Firm*—David H. Judson

[57] ABSTRACT

A time delayed cash dispenser is interconnected with a node processor which interfaces with an EFT system. The node processor emulates an ATM to access and perform transactions through the EFT system and activates a printer to issue scrip representative of authorized cash disbursements. The node processor also generates electronic commands to activate the cash dispenser upon manual entry of a transaction code to disburse cash in redemption for the scrip.

10 Claims, No Drawings

SCRIP CONTROLLED CASH DISPENSING SYSTEM

SUMMARY OF THE INVENTION

This invention relates to cash control and management of currency dispensing systems. More particularly, it relates to methods and apparatus for activating a time delayed cash dispenser to dispense cash on command after authorization and verification has been received from an electronic funds transfer host financial transactional computer.

Use of an automatic teller machine (ATM) which is operable at all hours has been widely accepted to satisfy needs for dispensing cash at unmanned remote locations. The convenience of ATMs has made them extremely popular with the general public. Moreover, retail merchandisers have found that on-premise location of an ATM attracts customers into the retail location who then tend to make cash purchases. Thus, the presence of an ATM tends to increase sales.

ATMs transmit and receive transaction authorization and verification information to and from an electronic funds transfer host financial transaction computer over telephone lines. Accordingly, they may be conveniently placed and operated at almost any desired remote location. Unfortunately, an ATM is quite expensive. Furthermore, the ATM's supply of cash must be periodically replaced, usually by an armored car service. Such servicing further increases the cost of ATM operation. Because of purchase and service costs, ATMs are not economically practical except at locations which attract relatively high use.

Retail establishments such as convenience stores, retail fuel sales stations and the like which handle large volumes of cash have long been targets of robbery, employee theft, etc. In recent times, cash management systems which employ a device known as a time delayed cash dispenser have become widely used to prevent such cash losses.

The timed delayed cash dispenser comprises a safe-like container into which cash is periodically placed for safe-keeping. The cash is periodically removed from the retail establishment's cash register and packaged in known amounts in small containers such as wrappers, tubes or the like. The containers are then deposited into the time delayed cash dispenser in vend columns. The cash containers cannot be removed from the time delayed cash dispenser except by activation of the apparatus to dispense one container at a time from a vend column. However, the apparatus can only be activated to permit withdrawals on a time delayed basis. Thus, once the machine has been activated to dispense one container, it cannot be activated to dispense another container until a pre-set time period has elapsed. Accordingly, even though the apparatus may contain a significant amount of cash at any one time, the attendant must account for each deposit and withdrawal and withdrawals can only be made at pre-determined timed intervals.

Time delayed cash dispensers as described above perform various other cash management functions and have been widely accepted and used to prevent theft, etc. Typical of such devices is the timed access cash controller sold under the trade designation TACC-II and more recent modifications thereof (referred to collectively as TACCs) currently sold by Tidel Engineering, Inc. of Carrollton, Tex.

As described above, ATMs and time delayed cash dispensers perform basically different functions for basically different purposes. However, both satisfy a distinct need for which the operator/user must pay a cost. Except for the cost, it would be desirable to locate an ATM at each location which has a time delayed cash dispenser.

The present invention provides a method of operating a time delayed cash dispenser to obtain most of the advantages of an ATM for an investment cost of only slightly more than a time delayed cash dispenser. In accordance with the invention, the cash dispensing apparatus operates in its normal time delayed mode except when activated by a vend command from a remote terminal. When activated by a vend command from the remote terminal, the cash dispenser is controlled by manual entry of a transaction identification code determined by the remote terminal. The remote terminal also issues scrip to the user and issues commands to the cash dispenser to permit withdrawal of specified cash without regard to the normal time delay restriction.

The system is comprised of conventional hardware assembled, interconnected and operated to interface with and utilize existing electronic funds transfer systems and to permit remote terminal initiated control of the cash dispenser for immediate operator withdrawal of an authorized amount of cash by entry of a transaction identification code relayed to the cash dispenser and verified by the scrip dispensing terminal.

The system of the invention permits immediate cash withdrawal from a time delayed cash dispenser, thus providing many of the advantages of an ATM without the attendant cost. Instead of providing a complete ATM, relatively inexpensive cash dispenser equipment can be controlled as described to provide many of the functions of an ATM. Scrip controlled cash dispensing systems in accordance with the invention can be installed at a fraction of the cost of installing an ATM. Moreover, modification of a time delayed cash dispenser to operate as a scrip dispenser controlled machine does not interfere with or in any manner compromise normal operation of the time delayed cash dispenser apparatus. Instead, the cash dispenser serves the dual role of a time delayed cash dispenser and a cash dispenser which responds to the direct issuance of a vend command from a remote terminal. Thus the utility of the time delayed cash dispenser is enhanced without any detrimental effects. Furthermore, since the scrip controlled system dispenses cash from a dispenser which is continuously re-loaded on site by the retail establishment attendant, the cost and inconvenience of armored car service loading of an ATM is obviated. Instead, the attendant replenishes cash stores by depositing cash from the cash register on the normal as-received basis. Thus the location, such as a convenience store or the like in which the system is installed, provides for its customers all the advantages of an ATM without suffering the purchase and service costs of an ATM. Furthermore, the location enjoys all the benefits of having an on-premises ATM (such as increased customer traffic, immediate cash availability for impulse purchases, etc.) as well as the advantages of having a time delayed cash dispenser for safe-keeping of cash on premises. The system provides the additional advantage of recirculating cash. Instead of storing cash in a safe or the like for later removal for banking, etc., the location-collected cash is continuously resold to cash customers via the electronic funds transfer system.

DESCRIPTION OF THE PREFERRED EMBODIMENT

In accordance with the present invention, a time delayed cash dispenser is coupled with a node processor which accesses and performs transactions through a conventional electronic funds transfer system. The node processor, however, generates scrip evidencing the transaction and transmits an electronic authorization command to the cash dispenser to dispense a specific amount of cash upon entry by the attendant of a transaction identification code. The node processor also generates a transaction identification code which is displayed on the scrip. The transaction identification code must be entered into the cash dispenser to activate the cash dispenser. Thus the user, using a conventional bank debit card or credit card, may access the electronic funds transfer system through the node processor terminal and perform cash withdrawals from a cash account or cash advances against an approved credit account. The node processor terminal, with respect to the electronic funds transfer system, functions as an ATM to transmit and receive electronic funds transfer (EFT) information. However, instead of dispensing cash (as would an ATM), the terminal prints scrip which may be redeemed from the cash dispenser only by operator entry of the specific transaction identification code relayed to the cash dispenser by the terminal. Thus the scrip dispensing system of the invention provides the ability to utilize the electronic funds transfer system to perform a transaction resulting in cash dispensing at a remote location without using an expensive ATM. By equipping time delayed cash dispensing apparatus to perform in accordance with the invention, the merchant/operator obtains all the advantages of an on-site ATM (e.g. increased customer traffic, etc.) without the attendant investment cost. Furthermore, since cash stores in the time delayed cash dispenser are continuously replenished by the local attendant/operator, the expense of servicing an ATM is avoided and the merchant obtains the added advantage of recirculating cash on-site by selling cash directly to a participating financial institution via the electronic funds transfer system.

It will be appreciated that the system of the invention utilizes a node processor terminal to access existing EFT systems via a telephone line modem. The transactions performed by the EFT system in response to transaction information transmitted to and from the node processor are, in all essential respects, the same as would be performed by the same system in response to transaction information transmitted and received by a standard ATM. Accordingly, insofar as interface with the EFT system is concerned, the information exchanged between the EFT system and the node processor terminal of the invention will be essentially the same as the information exchanged between the EFT system and a standard ATM. Accordingly, since the ATM-/EFT system is conventional state of the art, description herein of the specific transactional operations of the EFT system is not required.

Although the node processor terminal communicates with the EFT system in such a manner as to essentially emulate an ATM for purposes of cash dispensing, the node processor does not dispense cash. Instead, the node processor terminal activates a printer which produces scrip, preferably in the form of a two-part duplicate receipt, which is redeemable for cash. The terminal also generates a unique transaction identification code for each transaction. This unique transaction identification code is also printed on the scrip.

The time delayed cash dispenser is interconnected to the terminal and adapted to be activated to dispense cash as authorized by the terminal without regard to its normal time delay operation. However, the cash dispenser cannot be operated (outside its normal operation) until the unique transaction identification code has been entered by the retail attendant.

It will be readily realized that the system of the invention can be assembled and interconnected to perform the methods of the invention using conventional hardware components. For example, the node processor sold by VeriFone, Inc. of Redwood City, Calif. under the trade designation VeriFone PinStripe can be readily programmed to perform all the functions required of the node processor terminal as described above. A suitable printer is sold by the same company under the trade designation VeriFone Printer 250. The preferred cash dispenser is sold by Tidel Engineering, Inc. of Carrollton, Tex. under the trade designation TACC-EFM. Other -specific TACCs may also be modified to function as required. As described above, the PinStripe terminal communicates directly with conventional EFT systems via telephone lines.

In order to receive cash from the system described, the user must first activate the terminal. The terminal is preferably situated at a location within the retail establishment which is removed from the cash dispenser. The user must select the transaction to be performed from the menu presented by the terminal. After the transaction is selected, the terminal is activated by swiping the magnetic strip on the user's credit or debit card through the card slot on the terminal so that the terminal may capture the information encoded thereon and proceed to interface with the EFT system. Upon receipt of a specific transaction authorization from the EFT system, the terminal generates an electronic authorization command and transaction identification code which is unique for each specific transaction. The authorization command and unique transaction identification code are transmitted to the cash dispenser. The terminal also activates the printer to produce scrip which includes, among the transaction information, an alpha-numeric display of the unique transaction identification code specific for the transaction authorized.

In order to redeem the scrip and obtain cash from the cash dispenser, the unique transaction identification code must be entered into the command keyboard of the cash dispenser. The cash dispenser, upon entry and acceptance of the unique transaction identification code, dispenses cash in accordance with the specific authorization command received from the terminal.

It will be recognized that since the terminal is preferably located remote from the cash dispenser and the cash dispenser is located in a area accessible only to the retail attendant, the scrip issued to different users by the terminal may not be presented to the retail attendant in the sequential order in which it is generated. Accordingly, the system must correlate transaction identification code and authorization command to assure that the cash dispenser disburses the correct cash withdrawal for each user. The unique transaction code must, therefore, include information which correctly informs the cash dispenser of the proper authorization command for each particular transaction. The authorization command may be transmitted directly to the cash dispenser by the terminal and verified by the cash dispenser upon receipt of the transaction identification code or, alternatively, may be stored in the terminal and transmitted directly to the dispenser only upon request by the dispenser. Various other information transfer procedures may be utilized as desired to provide transaction security.

In the system arrangement described above, intervention by the retail attendant is required to redeem the scrip for cash. Thus, for further security, the user may be required to sign and surrender one copy of the scrip to receive the cash. As a further measure of security as well as cash control and accountability, the cash dispenser may require operator identification before the cash is dispensed. For this purpose the cash dispenser may include a magnetic card slot through which the magnetic strip of the attendant's identification card must be swiped so that the identity of the operator, time of transaction, etc., may be recorded. Various other security features may also be incorporated into the system as desired.

It will be recognized that the system may alternatively be arranged to permit the card holder to enter the transaction identification code directly into the command keyboard of the cash dispenser. This arrangement, properly monitored and otherwise controlled, may be used to remove store personnel from the transaction.

Safeguards against lost, mutilated or unredeemed scrip may be incorporated into the system of the invention. For example, the terminal may be programmed to void any transaction on which the scrip is not redeemed within a fixed time period. The terminal may simply void the authorization command or may also automatically re-access the EFT system and void the transaction. Various other security measures will be apparent to those skilled in the art.

While the invention has been described with specific reference to dispensing cash from a time delayed cash dispenser, it will be recognized that other conventional ATM functions which do not involve cash dispensing may be performed by the node processor terminal described. For example, the terminal may, if properly programmed, initiate other conventional EFT operations such as savings to checking transfers, checking to savings transfers, etc.

Even though the system of the invention emulates a ATM with respect to interfacing with the EFT system and the cardholder receives cash at the remote location, the invention differs basically from ATM operation in several respects. In the system of the invention, cash is stored in the cash dispenser and dispensed to the cardholder in discrete containers, wrappers or the like. Thus the cash handling mechanism of the cash dispenser is substantially less complicated and less expensive than the mechanism of ATMs. Furthermore, the retail attendant continuously re-supplies the cash dispenser with cash from the retail establishment's cash register, thus obviating the need for periodic servicing by armored car personnel. Furthermore, the system of this invention never dispenses cash directly from the transaction input terminal. Instead, the terminal always issues scrip which must be redeemed by operator entry of a transaction identification code at a cash dispenser which is remote from the terminal. Thus the invention always requires operator intervention to redeem scrip.

While the invention has been described with particular reference to use of specific commercially available components, the invention is not limited to use of these particular components. As will be understood by those skilled in the art, various devices may be assembled and programmed to perform the unique functions of the invention. It is to be understood, therefore, that the forms of the invention described in detail are to be taken as preferred embodiments thereof and that various changes and modifications may be resorted to without departing from the spirit and scope of the invention as defined by the appended claims.

What is claimed is:

1. The method of activating a time delayed cash dispenser to dispense cash on command comprising the steps of:

(a) requesting a specific transaction authorization from an electronic funds transfer system;

(b) receiving confirmation of a specific transaction authorization from an electronic funds transfer system;

(c) producing an electronic authorization command for activating a time delayed cash dispenser to dispense cash in accordance with said specific transaction authorization;

(d) producing a transaction identification code specific to said electronic authorization command;

(e) producing scrip representative of said specific transaction authorization which includes a display of said transaction identification code;

(f) transmitting said electronic authorization command to a time delayed cash dispenser; and (g) activating said cash dispenser to respond to said electronic authorization command by entry of said transaction identification code.

2. The method set forth in claim 1 including the step of delaying transmission of said electronic authorization command from said terminal to said cash dispenser until said terminal receives confirmation that said transaction identification code has been received by said cash dispenser.

3. The method set forth in claim 1 including the step of recording information representative of the identity of the person who activates said cash dispenser by entry of said transaction identification code.

4. The method set forth in claim 1 including the step of placing specified values of currency in discrete containers and loading such containers into specified vend columns in said cash dispenser.

5. A method of dispensing cash in response to a cash disbursement transaction authorized by an EFT system comprising the steps of:

(a) packaging known amounts of cash in discrete containers;

(b) depositing said discrete containers in cash dispenser apparatus adapted to dispense discrete containers in response to electronic commands;

(c) producing scrip representative of a cash disbursement authorized by an EFT system and displaying a transaction identification code specific to each such transaction; and (d) entering the transaction identification code as an electronic command to said cash dispenser to activate disbursement of containers of cash in the amount authorized by the EFT system.

6. The method of controlling operation of a time delayed cash dispenser comprising the steps of:

(a) requesting a specific transaction authorization from an electronic funds transfer system;

(b) receiving confirmation of a specific transaction authorization from an electronic funds transfer system;

(c) producing an electronic authorization command for activating a time delayed cash dispenser to dispense cash in accordance with said specific transaction authorization;

(d) producing a transaction identification code specific to said electronic authorization command;

(e) producing scrip representative of said specific transaction authorization which includes a display of said transaction identification code;

(f) transmitting said electronic authorization command to a time delayed cash dispenser; and (g) permitting activation of said cash dispenser to respond to said electronic authorization command by entry of said transaction authorization code only if said transaction identification code is entered into said cash dispenser within a specified time period.

7. The method set forth in claim 6 including the step of voiding the electronic authorization command if said cash dispenser is not activated to respond thereto within a specified time period.

8. Apparatus for activating a time delayed cash dispenser to dispense cash on command comprising:

(a) means for requesting a specific transaction authorization from an electronic funds transfer system;

(b) means for receiving confirmation of a specific transaction authorization from an electronic funds transfer system;

(c) means for producing an electronic authorization command for activating a time delayed cash dispenser to dispense cash in accordance with said specific transaction authorization;

(d) means for producing a transaction identification code specific to said electronic authorization command;

(e) means for producing scrip representative of said specific transaction authorization which includes a display of said transaction identification code;

(f) means for transmitting said electronic authorization command to a time delayed cash dispenser; and (g) means for activating said cash dispenser to respond to said electronic authorization command by entry of said transaction identification code.

9. Apparatus as defined in claim 8 including means for recording information representative of the identity of the person who enters the transaction identification code into the cash dispenser.

10. Apparatus as defined in claim 8 including means for voiding said electronic authorization command if said transaction identification code is not received by the cash dispenser within a specified time period.

* * * * *